US010719673B2

(12) United States Patent
Wilbert et al.

(10) Patent No.: US 10,719,673 B2
(45) Date of Patent: Jul. 21, 2020

(54) SYSTEM AND METHOD FOR COLLECTING AND/OR RETRIEVING INFORMATION RELATING TO OBJECTS

(71) Applicant: SAP SE, Walldorf (DE)

(72) Inventors: Anja Wilbert, München (DE); Georg Kreimer, München (DE); Sven Haiges, München (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/057,363

(22) Filed: Aug. 7, 2018

(65) Prior Publication Data
US 2019/0156077 A1    May 23, 2019

(30) Foreign Application Priority Data
Nov. 22, 2017    (EP) ..................... 17001910

(51) Int. Cl.
G06K 7/10    (2006.01)
G06F 3/12    (2006.01)
(Continued)

(52) U.S. Cl.
CPC ....... *G06K 7/10297* (2013.01); *G06F 3/1222* (2013.01); *G06F 3/1238* (2013.01);
(Continued)

(58) Field of Classification Search
CPC .......... G06K 7/10297; G06K 19/0723; G06K 7/10366; G06Q 10/087; G06F 3/1222; G06F 3/1238; G06F 3/1288; G06F 3/1292
See application file for complete search history.

(56) References Cited

U.S. PATENT DOCUMENTS 6,185,576 B1 * 2/2001 McIntosh ................ G06F 16/30
7,419,097 B2 * 9/2008 Lee ..................... G06K 7/10722
235/462.11
(Continued)

FOREIGN PATENT DOCUMENTS

| EP | 2199996 A1 | 6/2010 |
|----|------------|--------|
| EP | 2642445 A1 | 9/2013 |
| WO | 2016/138194 A1 | 9/2016 |

OTHER PUBLICATIONS

Communication: "Extended European Search Report", Feb. 16, 2018 (Feb. 16, 2018), European Patent Office, for European Application No. 17001910.3-1222, 9pgs.

*Primary Examiner* — Seung H Lee
(74) *Attorney, Agent, or Firm* — Buckley, Maschoff & Talwalkar LLC

(57) ABSTRACT

A system may comprise: an information storage device; RFID tags that are placed in different physical locations and contain information relating to a corresponding object, including at least identification information of the corresponding object; and provided at a physical location which facilitates access to the information by a user interested in the corresponding object; a mobile device configured to: select one or more objects of interest by establishing communication with one or more of the corresponding RFID tags; extract information relating to the one or more objects of interest from the one or more of the RFID tags corresponding to the one or more objects of interest; and send the extracted information to the information storage device via a wireless network, wherein the information storage device is configured to store the extracted information in association with an access code that enables access to the extracted information.

15 Claims, 6 Drawing Sheets

(51) Int. Cl.
    *G06K 19/07*    (2006.01)
    *G06Q 10/08*    (2012.01)

(52) U.S. Cl.
    CPC ..... *G06K 7/10366* (2013.01); *G06K 19/0723* (2013.01); *G06Q 10/087* (2013.01); *G06F 3/1288* (2013.01); *G06F 3/1292* (2013.01)

(56) References Cited

U.S. PATENT DOCUMENTS

| | | | |
|---|---|---|---|
| 9,767,430 B2* | 9/2017 | Schwartz | G06Q 10/087 |
| 10,216,840 B2* | 2/2019 | Ferguson | H04W 76/10 |
| 2008/0296392 A1 | 12/2008 | Connell, II et al. | |
| 2011/0238512 A1* | 9/2011 | Doty | G06Q 20/204 |
| | | | 705/17 |
| 2012/0041845 A1 | 2/2012 | Rothschild | |
| 2012/0095853 A1 | 4/2012 | von Bose et al. | |
| 2013/0024308 A1 | 1/2013 | Ramaswamy et al. | |
| 2013/0030915 A1 | 1/2013 | Statler et al. | |
| 2014/0214570 A1 | 7/2014 | Smolev | |
| 2017/0193438 A1* | 7/2017 | Jones | G06K 7/10366 |
| 2017/0272964 A1* | 9/2017 | Shatil | H04W 24/08 |

* cited by examiner

SYSTEM AND METHOD FOR COLLECTING AND/OR RETRIEVING INFORMATION RELATING TO OBJECTS

The application relates to a system and method for collecting and/or retrieving information relating to objects.

More specifically, the application relates to collecting and/or retrieving, via wireless communication, information relating to objects that may be placed in different physical locations.

According to an aspect, the problem relates to facilitating efficient collection and/or retrieval of information via wireless communication. The problem is solved by the features disclosed by the independent claims. Further exemplary embodiments are defined by the dependent claims.

According to an aspect, a system is provided for collecting and/or retrieving information relating to objects. The system may comprise:
an information storage device;
a terminal device connected to the information storage device;
radio-frequency identification, RFID, tags that are placed in different physical locations, wherein each one of the RFID tags:
  contains information relating to a corresponding object, the information including at least identification information of the corresponding object; and
  is provided at a physical location which facilitates access to the information relating to the corresponding object by a user interested in the corresponding object;
a mobile device configured to:
  select one or more objects of interest by establishing communication with one or more of the RFID tags corresponding to the one or more objects of interest;
  extract information relating to the one or more objects of interest from the one or more of the RFID tags corresponding to the one or more objects of interest; and
  send the extracted information to the information storage device via a wireless network,
wherein the information storage device is configured to store the extracted information relating to the one or more objects of interest in association with an access code that enables access to the extracted information relating to the one or more objects of interest; and
wherein the terminal device is configured to provide to the user, in response to a request from the user, the access code and/or the extracted information relating to the one or more objects of interest stored in the information storage device in association with the access code.

In various embodiments and examples described herein, the term "object" may be understood as indicating a physical, digital or ideologic item which a user may be interested in obtaining and/or monitoring.

In various embodiments and examples described herein, providing an RFID tag "at a physical location which facilitates access to the information relating to the corresponding object by a user interested in the corresponding object" may be understood as placing the RFID tag at a physical location which shows a clear relation to the corresponding object. In various embodiments and examples described herein, examples of providing an RFID tag "at a physical location which facilitates access to the information relating to the corresponding object by a user interested in the corresponding object" may include, but are not limited to: attaching the RFID tag to the object or to a sample of the object; placing the RFID tag in proximity of the object or of a sample of the object; attaching the RFID tag on an image (e.g., photograph or drawing) of the object or of a sample of the object; placing the RFID tag in proximity of an image of the object or of a sample of the object. The "proximity" of the object (or sample of the object or an image) may indicate, for example, within a distance such that the user can readily understand that the RFID tag corresponds to the object.

According to the system of the above-stated aspect, information relating to one or more objects of interest may be efficiently collected. Further, the collected information may be efficiently retrieved using an access code that is stored in association with the information relating to the one or more objects of interest.

In the system of the above-stated aspect, the RFID tags may be near field communication, NFC, tags.

Further, in the system of the above-stated aspect, the terminal device may be further configured to:
receive user input to modify the information relating to the one or more objects of interest stored in the information storage device in association with the access code; and
update, in the information storage device according to the received user input, the information relating to the one or more objects of interest stored in the information storage device in association with the access code.

Moreover, the system of the above-stated aspect may further comprise:
a server device connected to the information storage device, the server device being configured to:
  retrieve, from the information storage device, in response to a data request including the access code, the information relating to the one or more objects of interest stored in association with the access code; and
  output the information retrieved from the information storage device.

Moreover, the system of the above-stated aspect may further comprise:
an object information database configured to store object information for each object;
wherein the server device is further connected to the object information database; and
wherein the server device is further configured to:
  retrieve, from the object information database, using the identification information of the one or more objects of interest, included in the information retrieved from the information storage device, the object information stored for the one or more objects of interest; and
  output the retrieved object information stored for the one or more objects of interest.

In various embodiments and examples described herein, the object information of an object, stored in the object information database, may include at least one piece of information relating to the object, where the at least one piece of information is not contained in an RFID tag corresponding to the object.

Further, in the system of the above-stated aspect, the terminal device may be further configured to:
retrieve, from the object information database, using the identification information of the one or more objects of interest, included in the extracted information relating to the one or more objects of interest, the object information stored for the one or more objects of interest; and provide to the user the retrieved object information stored for the one or more objects of interest.

Further, in the system of the above-stated aspect, the terminal device may be configured to provide the access code to the user by printing the access code on a physical medium in a computer-readable format and/or in a human-readable format; and wherein the system may further comprise a client device configured to:
read the access code printed on the physical medium; and
send the data request including the access code to the server device.

In various embodiments and examples described herein, the term "physical medium" may be any medium on which the access code can be printed. For example, the physical medium may be a sheet of paper. Alternatively, for example, the physical medium may be a sheet of plastic.

Further, the system of the above-stated aspect may further comprise another mobile device configured to:
select one or more objects of interest by establishing communication with one or more of the RFID tags corresponding to the one or more further objects of interest;
extract information relating to the one or more further objects of interest from the one or more of the RFID tags corresponding to the one or more further objects of interest; and
send the extracted information to the information storage device via the wireless network,
wherein the information storage device is further configured to store the extracted information sent from the other mobile device in association with the access code.

According to another aspect, a method is provided for collecting and/or retrieving information relating to objects. The method may comprise:
providing radio-frequency identification, RFID, tags in different physical locations, wherein each one of the RFID tags:
contains information relating to a corresponding object, the information including at least identification information of the corresponding object; and
is provided at a physical location which facilitates access to the information relating to the corresponding object by a user interested in the corresponding object;
selecting, by a mobile device, one or more objects of interest by establishing communication with one or more of the RFID tags corresponding to the one or more objects of interest;
extracting, by the mobile device, information relating to the one or more objects of interest from the one or more of the RFID tags corresponding to the one or more objects of interest;
sending, by the mobile device, the extracted information to an information storage device via a wireless network;
storing, in the information storage device, the extracted information relating to the one or more objects of interest in association with an access code that enables access to the extracted information relating to the one or more objects of interest; and
providing to the user, by a terminal device connected to the information storage device, in response to a request from the user, the access code and/or the extracted information relating to the one or more objects of interest stored in the information storage device in association with the access code.

In the method of the above-stated aspect, the RFID tags may be near field communication, NFC, tags.

In some examples, the method of the above-stated aspect may further comprise:
receiving, by the terminal device, user input to modify the information relating to the one or more objects of interest stored in the information storage device in association with the access code; and
updating, by the terminal device, in the information storage device according to the received user input, the information relating to the one or more objects of interest stored in the information storage device in association with the access code.

In some examples, the method of the above-stated aspect may further comprise:
retrieving, from the information storage device by a server device connected to the information storage device, in response to a data request including the access code, the information relating to the one or more objects of interest stored in association with the access code; and
outputting, by the server device, the information retrieved from the information storage device.

Further, in the method of the above-stated aspect, the server device may be further connected to an object information database configured to store object information for each object; and wherein the method may further comprise:
retrieving, from the object information database by the server device, using the identification information of the one or more objects of interest, included in the information retrieved from the information storage device, the object information stored for the one or more objects of interest; and
outputting, by the server device, the retrieved object information stored for the one or more objects of interest.

Further, the method of the above-stated aspect may further comprise:
retrieving, from the object information database by the terminal device, using the identification information of the one or more objects of interest, included in the extracted information relating to the one or more objects of interest, the object information stored for the one or more objects of interest; and
provide to the user, by the terminal device, the retrieved object information stored for the one or more objects of interest.

Further, in the method of the above-stated aspect, the terminal device may provide the access code to the user by printing the access code on a physical medium in a computer-readable format and/or in a human-readable format; and wherein the method may further comprise:
reading, by a client device, the access code printed on the physical medium; and
sending, by the client device, the data request including the access code to the server device.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION OF EMBODIMENTS

In the following text, a detailed description of examples will be given with reference to the drawings. It should be understood that various modifications to the examples may be made. In particular, one or more elements of one example may be combined and used in other examples to form new examples.

In some circumstances, it may be desirable to collect and/or retrieve information relating to objects that are placed in different physical locations. In some examples, the objects may be physical items which a user may be interested in obtaining and/or monitoring. For more specific example, assume that objects are products in a physical shop, store or showroom where it is difficult, if not impossible, (e.g. due to the size of the products) for a customer to carry the products with him/her. In such a case, the customer may have a hard time to remember the products he/she is interested in, as he/she goes around in the shop, store or showroom. The customer may need to take photos and/or note down product information. Specifications of products often get forgotten, which makes it difficult for the customer to quickly recall specific products. Further, retailers may not know what customers are looking at in their shops or showrooms. The retailers do not always have insights in how customers are experiencing the product assortment and in which order the customers are getting inspired and what forms the interest of the customers. Further, the retailers might not have means to obtain real-time analytics data in a physical shop, store or showroom. Accordingly, a huge gap may exist between physical and online shopping experience.

In some other examples, the objects may be digital or ideologic items such as services, travel destinations, transportation means, hotels, insurances, pieces of information, etc.

Figure 1:
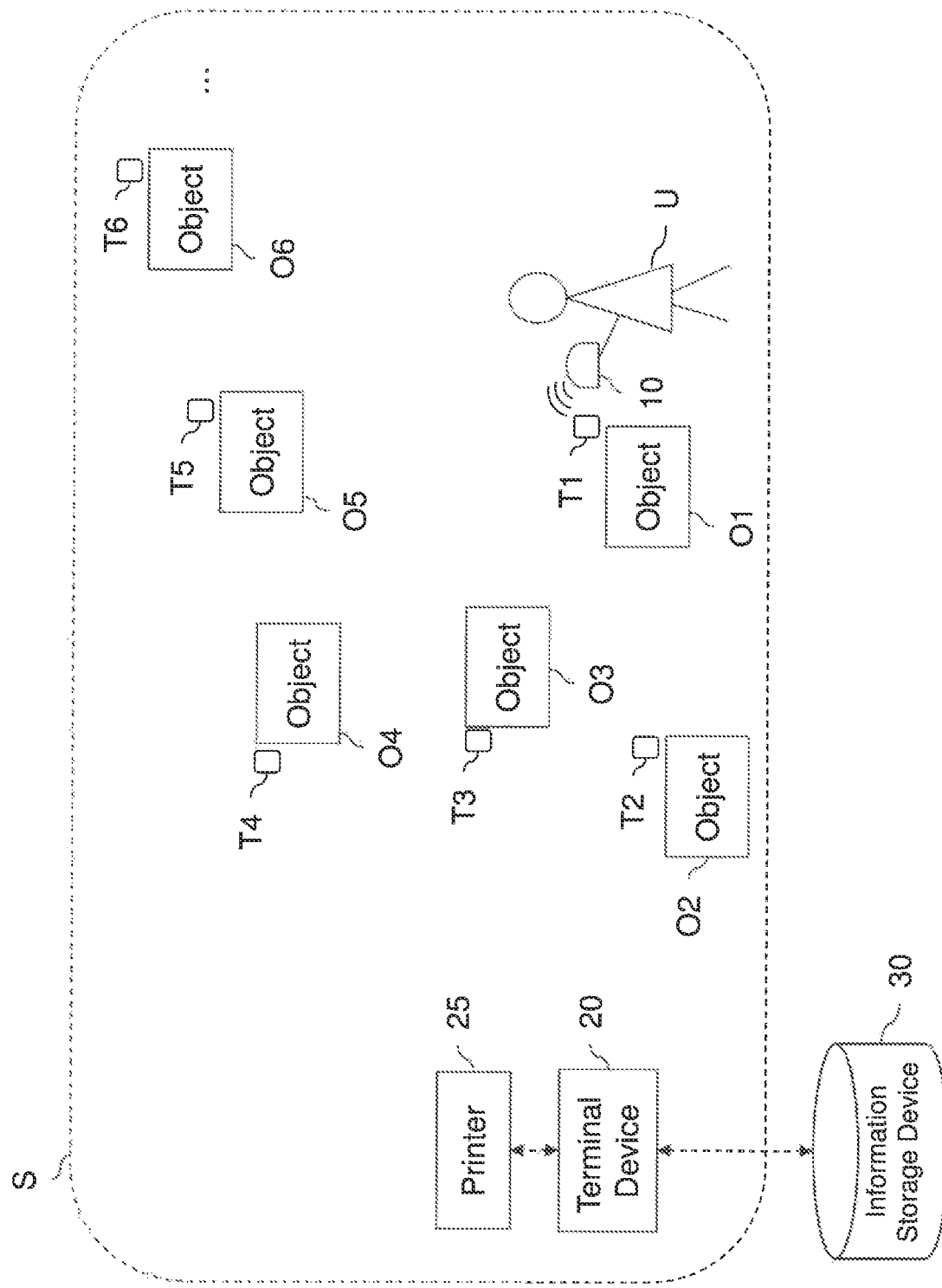
FIG. 1 shows an exemplary setup of a system according to the present disclosure.

FIG. 1 shows an exemplary setup of a system according to the present disclosure. In the exemplary setup shown in FIG. 1, objects O1, O2, . . . (hereinafter, collectively referred to as "objects O" or, in case of referring to one of the objects, as "object O") are provided at different physical locations in a certain area S. In this example, the area S may be at least part of a shop or store or showroom where certain products are sold. Further, in this example, the objects O may be the products sold in the area S. The products may be such products that are difficult for the customer to carry, for example, pieces of furniture, bathroom equipment, kitchen equipment, etc. In some circumstances, for at least one of the objects O shown in FIG. 1, a sample of the product may be provided in the area S, rather than the product itself. Additionally or alternatively, for at least one of the objects O shown in FIG. 1, an image (e.g. photograph or drawing) of the product or of a product sample may be provided in the area S.

In the example of FIG. 1, tags T1, T2, . . . (hereinafter, also collectively referred to as "tags T" or, in case of referring to one of the tags, as "tag T") are placed in different physical locations corresponding to the objects O. Each of the tags T may contain information relating to a corresponding object. The information contained in each tag T includes at least identification information of the corresponding object. In addition, the tag T may include further information relating to the corresponding object, e.g. characteristics of the object, availability of the object, a provider of the object, etc. Further, each of the tags T may be provided at a physical location which facilitates access to the information relating to the corresponding object by a user interested in the corresponding object. For instance, at least one of the tags T may be attached to the corresponding object O (or sample of the object or an image of the object/sample). Additionally or alternatively, at least one of the tags T may be placed in proximity of the corresponding object O (or sample of the object or an image of the object/sample), for example, within a distance such that the user U can readily understand that the particular tag corresponds to the particular object.

In some examples, the tags T may be RFID (radio-frequency identification) tags. In some cases, the RFID tags may be passive RFID tags that are activated by radio energy transmitted by an RFID reader. Further, in some cases, the RFID tags may have a low frequency band, e.g. 120 kHz to 150 kHz, with a read range of up to about 10 cm.

In other examples, the tags T may be NFC (near-field communication) tags. NFC may be a set of communication protocols that enable two electronic devices, one of which is usually a portable device, to establish communication by bringing the two devices within about 4.0 cm of each other. In some examples, the NFC may operate at a frequency of 13.56 MHz. The NFC standards may be based on RFID standards including, for example, ISO/IEC 14443 and FeliCa. In a specific example, the NFC may be standardized in ECMA-340 and ISO/IEC 18092.

In yet other examples, the tags T may be implemented by labels with computer-readable code such as bar code, QR code, etc. In yet other examples, the tags T may be implemented by labels with human-readable code, e.g., a combination of numbers, characters and/or symbols.

It should be noted that the number of the objects O and the corresponding tags T provided in the area S may be more than or less than that shown in FIG. 1.

In the example of FIG. 1, the user U (e.g., a customer) may carry a mobile device 10. The mobile device 10 may be configured to extract information from a tag T. In case the user U is interested in an object O, the user U may instruct the mobile device 10 to extract information contained in a tag T corresponding to the object of interest. The mobile device 10 may extract the information from the tag T and send the extracted information to an information storage device 30 via a wireless network (not shown). The information storage device 30 may store the extracted information sent from the mobile device 10.

Accordingly, as the user U moves around in the area S with the mobile device 10 and extracts information from one or more tags T corresponding to the one or more objects O of interest by the mobile device 10, the extracted information may be sent to and stored in the information storage device 30. The information storage device 30 may store the extracted information in association with an access code that enables access to the extracted information relating to the one or more objects O of interest. A single access code may be assigned to a single visit or tour in the area S by the user U and the information relating to the one or more objects of interest selected by the user U during the visit or tour may be stored in association with the access code.

In the example shown in FIG. 1, a terminal device 20 may be provided in the area S. In some circumstances, the terminal device 20 may be provided at a fixed position within the area S (e.g., for self-service). Additionally or alternatively, the terminal device 20 may be a mobile device, e.g. a tablet computer, which may be carried by a person (e.g., shop assistant, sales person, etc.) who provides assistance in the area S to the user U. The terminal device 20 may be connected to the information storage device 30. Optionally, the terminal device 20 may be further connected to a printer 25. The terminal device 20 may be configured to provide to the user U, in response to a request made by the user U, the access code and/or the extracted information relating to the one or more objects O of interest stored in the information storage device 30 in association with the access code. In some examples, the terminal device 20 may display the access code on a display device (not shown) comprised in the terminal device 20. In other examples, the terminal device 20 may print the access code on a physical medium such as paper using the optional printer 25 in a computer-readable format (e.g., barcode, QR code etc.) and/or a human-readable format. The access code may later be used by the user to retrieve the extracted information relating to the one or more objects of interest from the information storage device 30.

In some examples, the terminal device 20 may further have access to one or more server applications (not shown) which may provide non-physical storage medium for data. The terminal device 20 having access to one or more server applications may be further configured to obtain and provide to the user U the data and logic stored in the server application(s) concerning the one or more objects of interest selected by the user U. Further, in some circumstances, the server application(s) may be used as at least a part of the information storage device 30 as described above. In other words, at least a part of the information storage device 30 as described above may be implemented by the server application(s).

To summarize, the system according to an exemplary aspect of the present disclosure may comprise:
an information storage device;
a terminal device connected to the information storage device;
tags that are placed in different physical locations, wherein each one of the tags:
  contains information relating to a corresponding object, the information including at least identification information of the corresponding object; and
  is provided at a physical location which facilitates access to the information relating to the corresponding object by a user interested in the corresponding object;
a mobile device configured to:
  extract information relating to the one or more objects of interest selected by the user, from the one or more of the tags corresponding to the one or more objects of interest; and
  send the extracted information to the information storage device via a wireless network,
wherein the information storage device is configured to store the extracted information relating to the one or more objects of interest in association with an access code that enables access to the extracted information relating to the one or more objects of interest; and
wherein the terminal device is configured to provide to the user, in response to a request made by the user, the access code and/or the extracted information relating to the one or more objects of interest stored in the information storage device in association with the access code.

Figure 2:
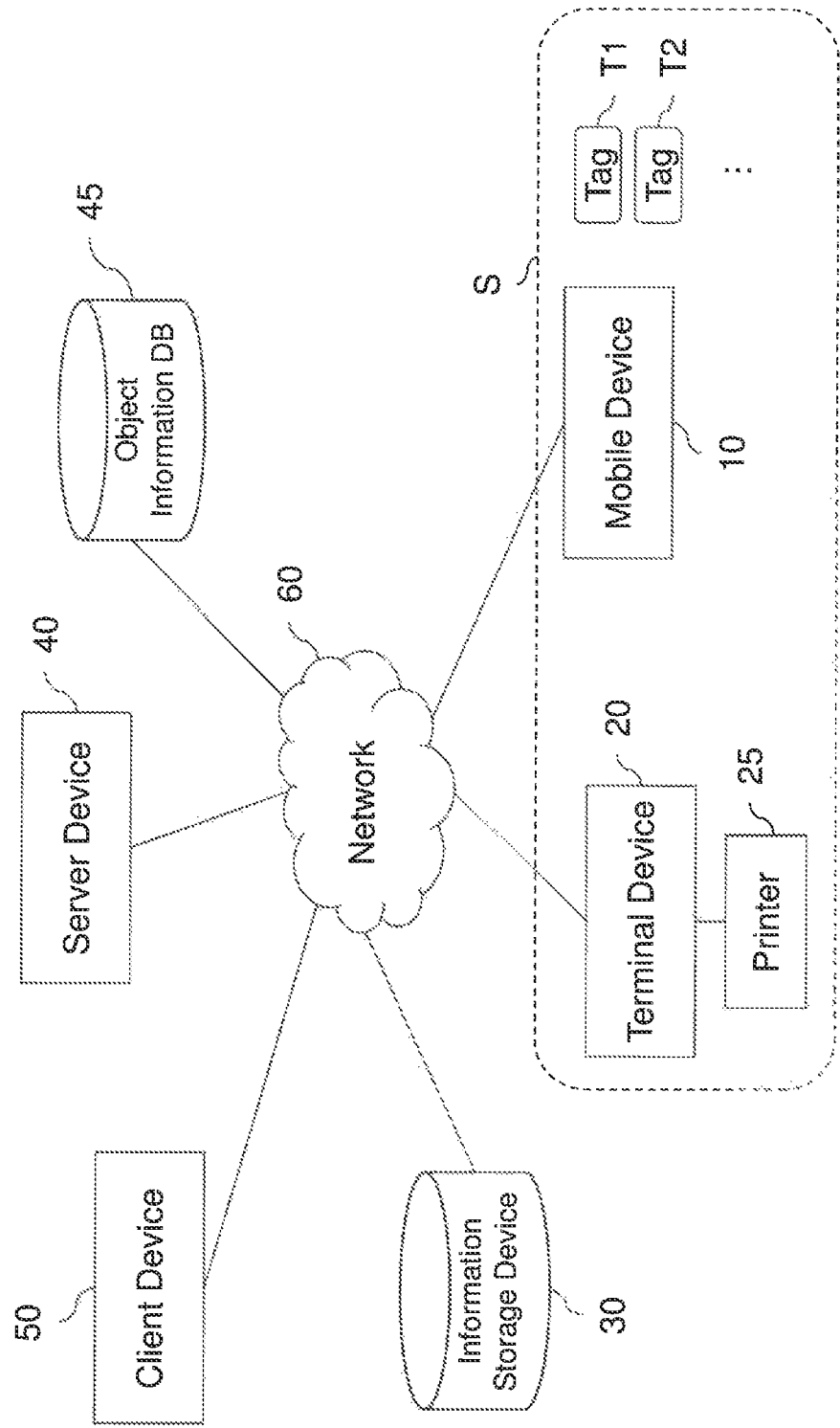
FIG. 2 shows an example of the system according to the present disclosure.

FIG. 2 shows an example of the system according to the present disclosure. As also stated above with reference to FIG. 1, the system shown in FIG. 2 may comprise the tags T, the mobile device 10, the terminal device 20 and the optional printer 25 in the area S. Further, the exemplary system shown in FIG. 2 may comprise the information storage device 30. The information storage device 30 may be connected to the terminal device 20 and the mobile device 10 via the network 60. The network 60 may include the Internet and/or one or more intranets. Further, at least part of the network 60 is implemented by a wireless network (e.g. wireless local area network (WLAN), cellular network, etc.). For instance, the mobile device 10 may communicate with the terminal device 20 and the information storage device 30 via the wireless network being part of the network 60.

The exemplary system shown in FIG. 2 may further comprise a server device 40, an object information database (DB) 45 and a client device 50 which may be connected to the network 60. The details of these devices will be described later below with reference to FIG. 3.

Figure 3:
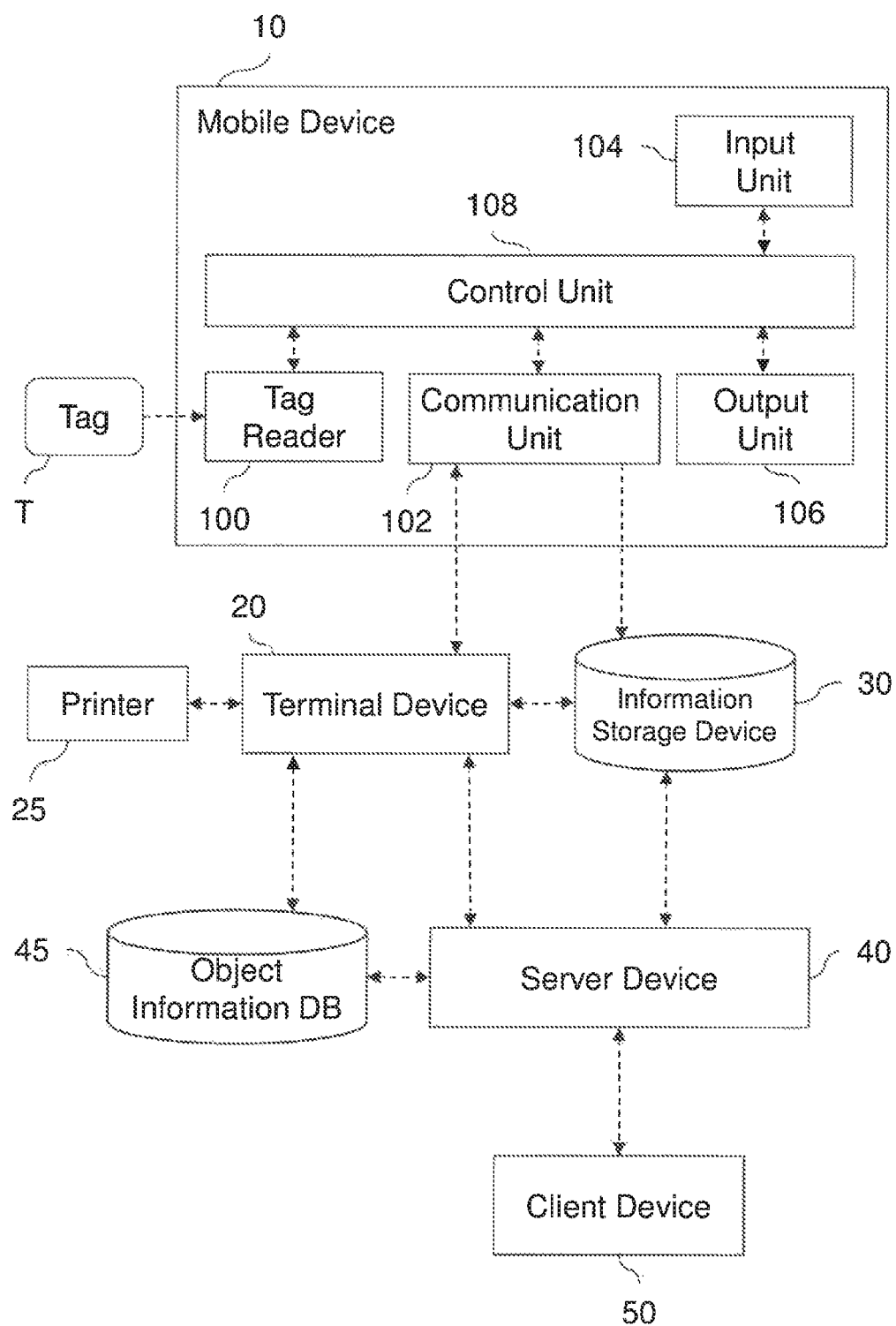
FIG. 3 shows an exemplary functional block diagram of the system according to the present disclosure.

FIG. 3 shows an exemplary functional block diagram of the system according to the present disclosure. As shown in FIG. 3, the mobile device 10 may comprise a tag reader 100, a communication unit 102, input unit 104, output unit 106 and a control unit 108.

The tag reader 100 may be configured to extract information from the tags T. The tag reader 100 may be implemented by a device that is suitable for extracting the information from the tags T, depending on the type of the tags T provided in the area S (see e.g., FIG. 1). For example, in case the tags T are RFID tags, the tag reader 100 may be implemented by an RFID reader. The RFID reader may be an active reader which transmits an interrogator signal to an RFID tag to communicate with the RFID tag. Further, for example, in case the tags T are NFC tags, the tag reader 100 may be implemented by an NFC reader comprising an initiator that generates a radio frequency field (RF field) that can power a passive NFC tag. Further, for example, in case the tags T are labels with computer-readable code such as barcode or QR code etc., the tag reader 100 may be implemented by a corresponding reader device, e.g., barcode reader or QR code reader, etc. Moreover, for example, in case the tags T are labels with human-readable code, the tag reader 100 may be implemented by an optical character recognition (OCR) reader device.

The communication unit 102 may be an interface for communicating with other devices such as the terminal device 20, the information storage device 30 and/or the server device 40. The communication unit 102 may be implemented by, for example, a network interface that enables communication via a wireless network.

The input unit 104 may be configured to receive inputs from the user. The input unit 104 may comprise, for example, one or more switches (e.g., buttons) corresponding to one or more possible user instructions. For instance, one of the switches may correspond to a user instruction to start extracting information from one or more tags T corresponding to one or more objects O of interest. Pressing of such a switch by the user may indicate start of a visit or tour in the area S by the user, for example. Further, for example, one of the switches may correspond to a user instruction to activate the tag reader 100. Moreover, one of the switches may correspond to a user instruction to end extracting information from the tags T. Pressing of such a switch by the user may indicate end of the visit or tour in the area S by the user, for example. The one or more switches as stated above may be implemented by mechanical switches or by a touch panel displaying the switches.

In some examples, the mobile device 10 does not necessarily comprise the input unit 104. In case the mobile device 10 does not comprise the input unit 104, the start and end of the visit or tour in the area S by the user may be determined by, for example, detecting whether or not the mobile device 10 is connected to a charging device (not shown) and/or is located in a specified location within the area S. The specified location may be, for example, a location close to an entrance of the area S. For instance, the start of the visit or tour may be determined when the mobile device 10 connected to the charging device is detached from the charging device and/or when the mobile device 10 is removed from the specified location. Further, for instance, the end of the visit or tour may be determined when the mobile device 10 is again connected to the charging device and/or when the mobile device 10 has been placed in a specified location. The specified location may be, for example, a location close to an exit of the area S and/or a location close to the terminal device 20. The specified location for determining the end of the visit or tour may be different from or identical to the specified location for determining the start of the visit or tour. In order for detecting whether the mobile device is placed in one or more specified locations, the mobile device 10 may comprise, for example, a sensor configured to detect signals that are present at or within a certain range from the one or more specified locations, where each of the one or more specified locations may be provided with a device configured to output the signals that reach within a certain range. The recognition of a specific area in which the mobile device 10 is present may also be performed for detecting the mobile device 10 being stolen.

The output unit 106 may be configured to provide outputs. The output unit 106 may comprise, for example, a haptic output device, an audio output device, an illumination device and/or a display device. In some examples, the output unit 106 may provide an output indicating whether or not extraction of information from a tag T has been successful. For instance, in case the output unit 106 comprises a haptic output device (e.g., vibration motor), the output unit 106 may output different haptic effects depending on whether the extraction of information has been successful. Further, in case the output unit 106 comprises an audio output device, the output unit 106 may output different audio outputs depending on whether or not the extraction of information has been successful. Moreover, in case the output unit 106 comprises an illumination device such as a device including one or more light-emitting diodes (LEDs) (e.g., neopixel strip), the output unit 106 may emit light with different colors depending on whether or not the extraction of information has been successful (e.g., green light in case of success and red light in case of failure). Further, in case the output unit 106 comprises a display device, the output unit 106 may display on the display device information indicating whether or not the extraction of information has been successful.

The control unit 108 may be configured to control the mobile device 10. The control unit 108 may be implemented by a processor and a memory, for example. In some examples, the control unit 108 may be implemented by a particle photon which is a microcontroller with built-in Wifi for connectivity. The control unit 108 may be configured to control the tag reader 100, the communication unit 102 and the output unit 106 of the mobile device 10 to perform processing as described herein.

In some examples, the mobile device 10 may be implemented by a portable device specifically designed to be used in the system of various embodiments and examples described herein. Such a portable device may comprise, for example, a particle photon (implementing the control unit 108), a lithium polymer battery, a charging circuit on a custom-made printed circuit board (PCB), an NFC reader (as the tag reader 100), a vibration motor for haptic feedback that includes the diode/transistor on the custom-made PCB (as a part of the output unit 106) and a neopixel strip for visual signaling (as a part of the output unit 106), which may be contained in a case specifically designed for use in the system.

In other examples, the mobile device 10 may be implemented by, for example, a smartphone or a tablet computer, with a software application that causes the device to perform the processing of the mobile device 10 as described herein.

As stated above with reference to FIG. 1, the terminal device 20 may be configured to provide, in response to a request made by the user, the access code and/or the information relating to the one or more objects of interest, which is extracted from the tags T and stored in the information storage device 30. In some examples, the access code and/or the information relating to the one or more objects of interest may be printed on a physical medium using the printer 25. Further, in some examples, the terminal device 20 may be further configured to send a data request including the access code to the server device 40 in order to obtain further information relating to the one or more objects of interest. The further information relating to the one or more objects of interest may be stored in the object information DB 45. The terminal device 20 may be further configured to provide to the user the further information relating to the one or more objects, obtained by sending the data request to the server device 40.

The object information DB 45 may store object information for each object. The object information may be information relating to an object and may include at least one piece of information that is not contained in the tag corresponding to the object. The object information DB 45 may, for example, store the object information of an object in association with identification information of the object. In the examples where the objects are products to be sold in the area S, the object information stored in the object information DB 45 may include, but is not limited to, a location of the product, identification information of at least one storage shelf where the object is stored, rest in stock of the object, possible delivery dates of the object, promotions relating to the object, offerings relating to the object, cross sells relating to the object, bundles of the objects, etc.

The server device 40 may be implemented by a server computer. The server device 40 may be configured to retrieve, from the information storage device 30, in response to a data request including the access code, the information relating to the one or more objects of interest stored in association with the access code. The data request may be made, for example, by the terminal device 20 and/or the client device 50. The server device 40 may be further configured to output, to the device which has made the data request, the information retrieved from the information storage device 30. Further, the server device 40 may be configured to retrieve, from the object information database 45, using the identification information of the one or more objects of interest, the object information stored for the one or more objects of interest. The identification information of the one or more objects of interest may be included in the information retrieved from the information storage device 30 in response to the data request. The server device 40 may be further configured to output, to the device which has made the data request, the retrieved object information stored for the one or more objects of interest.

In some examples, the server device 40 may provide further application(s) which uses the information relating to the object(s) of interest selected by the user. For example, the server device 40 may provide an online shopping website from which the user may place purchase orders of the object(s) of interest selected by the user in the area S.

The client device 50 may be implemented by a computer such as a personal computer. In some examples, the client device 50 may be a mobile device such as mobile phone (e.g. smartphone), a tablet computer, a laptop computer, a personal digital assistant (PDA), etc. The client device 50 may be configured to obtain the access code from the user and send a data request including the access code to the server device 40.

It should be noted that the system described above with reference to FIGS. 1 to 3 provides a mere example of the system according to the present disclosure and the system may have different configurations than the one shown in FIGS. 1 to 3. For example, the system may include more than one client device 50. Further, for example, more than one mobile device 10, more than one terminal device 20 and/or more than one printer 25 may be provided in the area S shown in FIGS. 1 and 2. Moreover, the system may comprise more than one area S provided with a plurality of tags T, at least one mobile device 10 and at least one terminal device 20. Further, although the information storage device 30 and the object information DB 45 are described above as two different devices, the information storage device 30 and the object information DB 45 may be implemented in a single database device. On the other hand, the information storage device 30 and/or the object information DB 45 may be implemented by a plurality of storage devices which are connected by the network 60. For instance, the information storage device 30 and/or the object information DB 45 may be implemented using the cloud storage technology.

Figure 4:
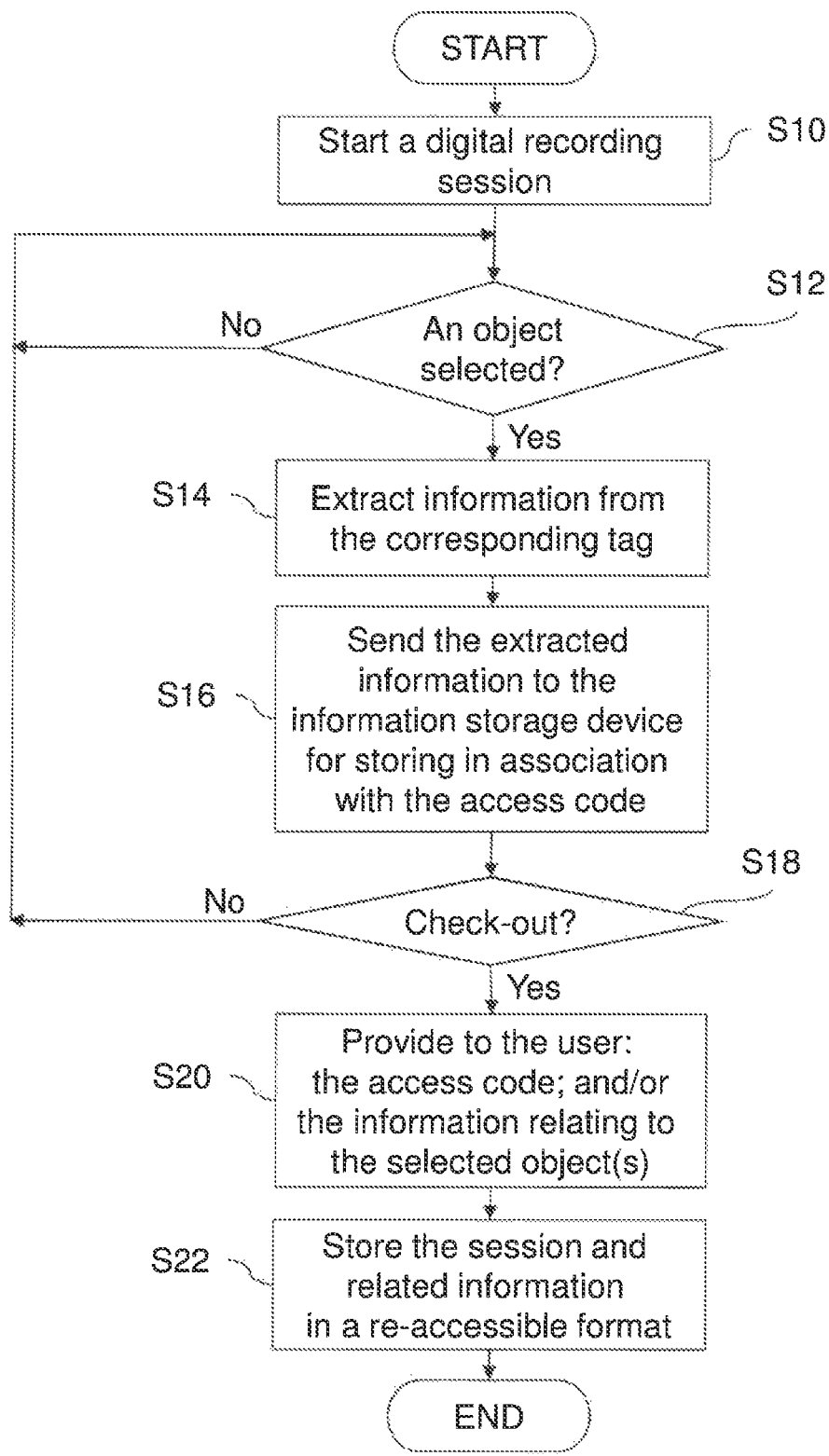
FIG. 4 shows a flowchart of an exemplary processing for collecting and/or retrieving information relating to one or more objects of interest.

FIG. 4 shows a flowchart of an exemplary processing for collecting and/or retrieving information relating to one or more objects of interest.

The exemplary processing of FIG. 4 may start at the start of a visit or tour in the area S by the user. For example, the exemplary processing of FIG. 4 may start when the user gives an input instructing the start of the exemplary processing to the mobile device 10. Such an input may be made using the input unit 104 of the mobile device 10. Alternatively, for example, the exemplary processing of FIG. 4 may start when the mobile device 10 is switched on using, e.g. a power switch (not shown) of the mobile device 10. In yet another example, the exemplary processing of FIG. 4 may start when the mobile device 10 is removed from a charger (not shown) for charging the battery (not shown) of the mobile device 10. In yet another example, the exemplary processing of FIG. 4 may start when the mobile device 10 is removed from a specified location within the area S.

In step S10, a digital recording session may be started. The digital recording session may correspond to a visit or tour in the area S by the user. For example, in step S10, an access code may be generated. The access code may include, for example, identification information of the mobile device 10, identification information of the area S in which the mobile device 10 is provided and/or the date and time at which the processing of step S10 is performed. In some examples, the access code does not include any identification information of the user U so that the user U may stay anonymous. In some examples, the access code may be generated by the mobile device 10. In other examples, the access code may be generated by the terminal device 20. In yet other examples, the access code may be generated by the server device 40 or the information storage device 30. In case the access code is generated by a device other than the mobile device 10 (e.g. by the terminal device 20, the server device 40 or the information storage device 30), the mobile device 10 may communicate with the device configured to generate the access code and request generation of the access code in step S10. In response to the request from the mobile device 10, the device configured to generate the access code may generate the access code and send the generated access code to the mobile device 10. In any case, the access code may correspond to one visit or tour of the user in the area S, e.g. shop, store, show room etc.

In step S12, a determination may be made by the mobile device 10 as to whether an object is selected. The selected object may be considered as an object of interest. For example, the mobile device 10 may determine that an object is selected when the user gives an input to the mobile device 10, instructing to activate the tag reader 100 of the mobile device. This input may be made by the input unit 104 of the mobile device 10, for example. Alternatively or additionally, in case the tag reader 100 is an RFID reader or NFC reader, for example, the mobile device 10 may determine that an object is selected when the tag reader 100 establishes communication with a tag T. For instance, in case of an RFID reader or NFC reader as the tag reader 100, the communication with a tag T can be established when the tag reader 100 is placed within the respective read ranges from the tag T, e.g. about 10 cm for RFID and about 4.0 cm for NFC.

If the mobile device 10 determines that an object is selected (yes in step S12), the processing may proceed to step S14. Otherwise (no in step S12), the determination of step S12 may be repeated.

In step S14, the tag reader 100 of the mobile device 10 may extract information from the tag T corresponding to the selected object, e.g. the object of interest. For example, in case the tag reader 100 of the mobile device 10 is an RFID reader or NFC reader, the tag reader 100 may extract information from the corresponding RFID tag or NFC tag by generating an RF field and communicating with the tag. Further, for example, in case the tag reader 100 of the mobile device 10 is a reader device for computer-readable code, the tag reader 100 may extract information from the tag T with computer-readable code (e.g. barcode, QR code, etc.) by scanning the code provided on the tag T. Further, for example, in case the tag reader 100 of the mobile device 10 is an OCR device, the tag reader 100 may extract information from the tag T with human-readable code, by scanning the human-readable code and performing character recognition on the scanned code. Regardless of the type of the tag reader 100, the output unit 106 of the mobile device 10 may output haptic, visual and/or audio feedback to the user when the information is successfully extracted from the tag T.

In step S16, the mobile device 10 may send the extracted information to the information storage device 30 for storing in association with the access code. In some examples, the mobile device 10 may send the access code to the information storage device together with the extracted information. The information storage device 30 may store the extracted information in association with the access code.

In step S18, a determination may be made as to whether or not the user wishes to end the visit or tour in the area S. In some examples, this determination may be made by the mobile device 10. For example, the mobile device 10 may determine that the user wishes to end the visit or tour in the area S, in response to a user input indicating the end of the visit or tour. This user input may be made by the input unit 104 of the mobile device 10, for example. Alternatively, for example, the mobile device 10 may determine the end of the visit or tour when the mobile device 10 is placed back onto the charging device (not shown). In yet another example, the mobile device 10 may determine the end of the visit or tour when the mobile device 10 is placed in a specified location within the area S, e.g. close to the exit of the area S and/or to the terminal device 20. In yet another example, it may be determined that the user wishes to end the visit or tour in the area S when the mobile device 10 is switched off using the power switch (not shown) of the mobile device 10. In this case, an input indicating the end of the visit or tour in the area S may be entered to the terminal device 20 when (or after) switching off the mobile device 10.

In case it is determined that the user still does not wish to end the visit or tour in the area S (no in step S18), the processing may return to step S12. In case it is determined that the user wishes to end the visit or tour in the area S (yes in step S18), the processing may proceed to step S20.

In step S20, the terminal device 20 may provide to the user, the access code and/or the information relating to the selected object(s), e.g. object(s) of interest. The terminal device 20 may obtain the access code from the mobile device 10, for example. Further, for instance, the terminal device 20 may retrieve the information relating to the selected object(s) from the information storage device 30 using the access code. In step S20, the provision of the access code and/or the information relating to the selected object(s) may be made in response to a request from the user. The request can be made using an input device (not shown) of the terminal device 20, for example. Alternatively, the request can be made using the mobile device 10 communicating with the terminal device 20. For instance, the end of the visit or tour determined in step S18 may be notified to the terminal device 20 and be considered as the request from the user to provide the access code and/or the information relating to the selected object(s). In some examples, in step S20, the terminal device 20 may display the access code and/or the information relating to the selected object(s) on a display device (not shown) of the terminal device 20. Alternatively or additionally, the terminal device 20 may print the access code on a physical medium such as paper using the printer 25 in a computer-readable format (e.g., barcode, QR code, etc.) and/or a human-readable format (e.g., combination of numbers, characters and/or symbols). Alternatively or additionally, the terminal device 20 may generate an electronic message (e.g., email, SMS (short message service) message, etc.) including the access code and/or the information relating to the selected objects and send the generated message to a client device 50 of the user.

In step S22, the session and related information may be stored in the information storage device 30 in a re-accessible format. The related information may include the information relating to the selected object(s) which is collected in the processing loop including steps S12, S14, S16 and S18. In addition, the related information may include identification information of the area S, identification information of a person who has assisted the user in the area S and/or date and time of the start and/or end of the session (e.g., the visit or tour in the area S by the user). The related information may be stored in the information storage device 30 in association with the access code so that the related information may later be retrieved (e.g., re-accessed) using the access code.

The processing shown in FIG. 4 may end after step S22.

It should be noted that the processing shown in FIG. 4 is a mere example of the processing performed by the system according to the present disclosure and the system may also perform processing different of that shown in FIG. 4.

For example, the terminal device 20 may accept user input to modify the information relating to the selected object(s) provided to the user in step S20. For instance, the user may add further object(s) and/or remove one or more objects from a list of objects included in the information provided in step S20. Identification information of potential objects to be added to the list may be obtained, for example, from the object information DB 45. The terminal device 20 may update the information stored in the information storage device 30 in association with the access code according to the modification made by the user.

Further, for example, the terminal device 20 may provide to the user, in addition to the extracted information, further object information of the selected object(s), obtained from the object information DB 45. In such examples, the terminal device 20 may retrieve the object information of the selected object(s) using identification information of the selected object(s) included in the information stored in the information storage device 30 in association with the access code.

Further, for example, the terminal device 20 may be configured to initiate further function(s) and/or action(s) concerning the selected object(s). The function(s) and/or action(s) may include, but are not limited to, packing of one or more of the selected object(s) in a warehouse, deleting items, making price request(s) of one or more of the selected object(s), etc.

Further, for example, the access code does not necessarily be generated in the beginning of the processing for collecting information relating to the object(s) of interest. For instance, referring to FIG. 4, instead of performing step S10, the mobile device 10 may notify the terminal device 20 and/or the information storage device 30 of the start of the visit or tour by the user and then perform steps S12 to S18. When the mobile device sends the extracted information in step S16, the information storage device 30 may store the extracted information sent from the mobile device 10 in association with identification information of the mobile device 10, for example. Further, when the end of the visit or tour by the user is determined in step S18, the mobile device 10 may notify the terminal device 20 and/or the information storage device 30 of the end of the visit or tour. The terminal device 20 or the information storage device 30 may then generate an access code corresponding to the visit or tour and store the generated access code in the information storage device 30 in association with the extracted information stored during the iteration of the steps S12 to S18.

Further, for example, although only one mobile device 10 is used in the processing of FIG. 4, more than one mobile device 10 may be used for selecting objects of interest and the objects selected by the more than one mobile device 10 may be associated with a single access code. In such examples, said more than one mobile device 10 may be carried by different users and be assigned the single access code.

Further, for example, in addition to or alternative to extracting information from a tag corresponding to a selected object, extraction of information from a tag corresponding to a preconfigured set of objects may be performed using the mobile device 10. For instance, the preconfigured set of objects may relate to an assortment of products that can be suitable for a particular purpose and/or circumstance. For specific examples, assortments of products may include products for different types of rooms in a household such as a kids room for 3 to 5 years old, a kids room for 5 to 12 years old, a master bathroom, a guest toilet, etc. The tag may contain information relating to the preconfigured set of objects. In some examples, the tag corresponding to the preconfigured set of objects may be provided on a card (e.g., a menu card) indicating the particular purpose and/or circumstance for which the preconfigured set of objects is suitable. The card may be provided to the user during the visit or tour in the area S by the user. In case the user extracts the information contained in the tag of the card using the mobile device 10, the information relating to the selected, preconfigured set of objects (e.g. the selected assortment of objects) may be loaded into the digital session of the user, e.g. by storing the extracted information in the information storage device 30. Further, information indicating which one(s) of the selected assortment of objects are selected by the user letting the mobile device 10 extract information from the tag(s) corresponding to the selected object(s) (e.g., by performing the steps S12 to S16 in FIG. 4) during the visit or tour in the area S may be stored in the information storage device 30. In other words, the selected assortment of objects may be "filled with items" the user tabs throughout the selection process in the area S. The terminal device 20 may provide information indicating the selected assortment of objects and which object(s) has (have) already been "found" (e.g. selected) and which ones are still missing for the particular purpose and/or circumstance for which the selected assortment of objects is suitable (e.g., for having everything for a boys child room). In this example, in some circumstances, the user may be guided throughout the selection (or shopping) process not to forget about an item which will be required for completing the selected assortment of objects.

Moreover, in some examples, as the information relating to the objects of interest(s) is collected by repeating steps S12 to S18 of FIG. 4, the action of the user (e.g., movement of the user in the area S, selection of the object(s), etc.) and/or the information sent to the information storage device 30 may be monitored and/or analyzed in real-time. For instance, the server device 40 may provide software application in which the providers of the objects (e.g., retailers of the products in the shop, store or showroom) may monitor and/or analyze the action of the user and/or the information sent to the information storage device 30. In such examples, the mobile device 10 may be further configured to send, to the server device 40, information indicating current location of the user.

As stated above, the access code enables access to the information relating to the selected object(s) of interest. The user may later use the access code provided by the terminal device 20 at step S20 of FIG. 4 to access the information relating to the selected object(s), for example, with the client device 50.

Figure 5:
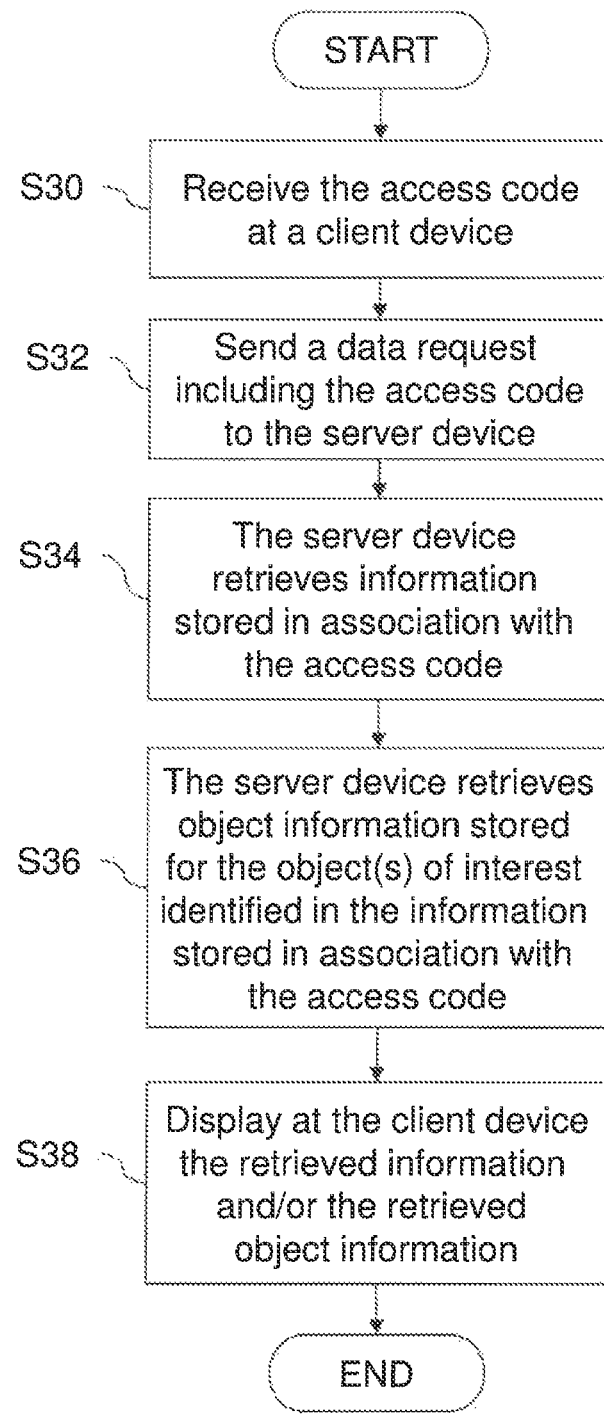
FIG. 5 shows a flowchart of an exemplary processing performed by a client device and a server device.

FIG. 5 shows a flowchart of an exemplary processing performed by the client device 50 and the server device 40.

In step S30, the client device 50 may receive the access code. For example, in case the access code is printed on a physical medium, the client device 50 may capture an image of the access code with an imaging device (not shown) connected to or comprised in the client device 20 and read the access code. In case the access code is printed in a computer-readable format (e.g. barcode or QR code, etc.), the client device 50 may comprise a reader device corresponding to the computer-readable format (e.g., barcode reader or QR code reader). In case the access code is printed in a human-readable format, the client device 50 may comprise an OCR device. The reader device or the OCR device may be implemented on the client device 50 with a corresponding software, for example. Alternatively or additionally, in case the access code has been sent to the client device 50 with an electronic message, the client device 50 may retrieve the access code from the received message. Alternatively or additionally, the user may input the access code using an input device (e.g. keyboard) of the client device 50.

In step S32, the client device 50 may send a data request including the received access code to the server device 40.

In step S34, the server device 40 may retrieve, from the information storage device 30, information stored in association with the access code. The information stored in the information storage device 30 in association with the access code may include information extracted from the tags corresponding to the object of interest which were selected by the user during a visit or tour in the area S.

In step S36, the server device 40 may retrieve, from the object information DB 45, object information stored for the object(s) of interest identified in the information stored in association with the access code. More specifically, for example, the server device 40 may obtain the identification information of the object(s) of interest included in the information retrieved from the information storage device 30. The server device 40 may then retrieve the object information from the object information DB 45 using the identification information of the object(s) of interest.

In step S38, the information retrieved from the information storage device 30 and/or the object information DB 45 may be displayed at the client device 50. For example, the server device 40 may send the information retrieved from the information storage device 30 and/or the object information DB 45 to the client device 50 and the client device 50 may display the information sent from the server device 40 on a display device (not shown) of the client device 50.

After step S38, the processing shown in FIG. 5 may end.

The examples described above with reference to FIGS. 1 to 5 may enable efficient collection and/or retrieval of information relating to one or more objects that may be placed in different physical locations. In particular, the following exemplary use case may be possible:

First, a customer (e.g. user U) walks into a store (e.g., area S) to look at several items (e.g., objects O). At the entrance of the store, the customer receives the mobile device 10. Once a tag T corresponding to an item of interest is scanned with the mobile device 10, the customer receives a visual feedback (e.g., flashing green if positive, flashing red if negative) from the mobile device 10. The customer proceeds in this way while walking through the entire store. At an "instore terminal" (e.g. terminal device 20) the customer can load identification information of all collected items (e.g., extracted from the tags T) and their data (e.g., obtained from the object information DB 45) to a screen (e.g. display device of or connected to the terminal device 20). All selected items will be clustered and displayed on the screen. Here, the customer can select/deselect the items of interest, compare, edit quantities, look up further item data (e.g., location, storage shelves, rest in stock, deliver dates, promotions, offerings, cross sells, bundles, etc. stored in the object information DB 45).

From the user interface (UI) of the instore terminal, the customer can print out the list or print out an access code (e.g. QR code) to this created session (e.g. corresponding to the visit or tour in the store by the user). The customer can connect the session to his own account (e.g. created for using an online store provided by the server device 40) and save the digital list to it. It is also possible to proceed with purchasing right away. By using the access code, the customer can later access the session with stored data in the online store on any touch point (e.g. client device 50). Until connecting to an account the customer stays anonymous.

In the exemplary use case as stated above, real omni-channel can be enabled by digitizing the full customer experience. With the examples of the system described above with reference to FIGS. 1 to 5, users can generate digital wish lists in a physical environment. For the retailer, on the other hand, the single point of view of the customer for an individualized experience may be enabled, by capturing all interactions of the users in the physical space and feeding other channels with this data. This may empower retailers to fill big gaps in customer profiles, moving one step closer to the targeted 360-degree view of a customer. This may be enabled by the seamless combination of software components and the mobile device 10, which can retrieve product information by scanning tags (e.g. NFC tags) that are attached to the respective products, samples or images of products or samples.

Further, with the examples of the system described above with reference to FIGS. 1 to 5, anonymous in-store customer may be converted into full omni-channel customer profile and may enable real-time analytics for the physical retail space. This may lead to an improved customer support in-store due to better knowledge of the customer.

Further, the examples of the system described above with reference to FIGS. 1 to 5 may be implemented in a store, shop or showroom with minimal invasive installation (e.g., NFC tags on products, mobile devices 10, instore terminal (e.g. terminal device 20), access code printer (e.g. printer 25), wifi etc.). Further, the selected items by physically scanning the tags can be instantly digitized and thus be accessible from any other touch point. The mobile device 10 may communicate with any listening service in real-time via wifi connection. By the examples of the system described above with reference to FIGS. 1 to 5, users within the physical store can easily memorize items of interest and be given the possibility to instantly create list of items of interest, access them on any other touchpoint and/or enable further workflows (e.g. assistant or 3rd party).

The examples of the system described above with reference to FIGS. 1 to 5 may be applicable for e.g., fairs, exhibitions, warehouses, furniture shops, bathroom equipment shops, wine storages, etc. In other words, where the customer cannot take items away right away and where a physical cart is not applicable. The examples of the system described above with reference to FIGS. 1 to 5 may be used in B2B scenarios, as well as B2B2C. The examples of the system described above with reference to FIGS. 1 to 5 may provide the above-stated advantages for any process, which requires information of a plurality of objects to be stored and requires support for the customer as well as the retailer or any other party involved in the process.

Hardware Configuration

Figure 6:
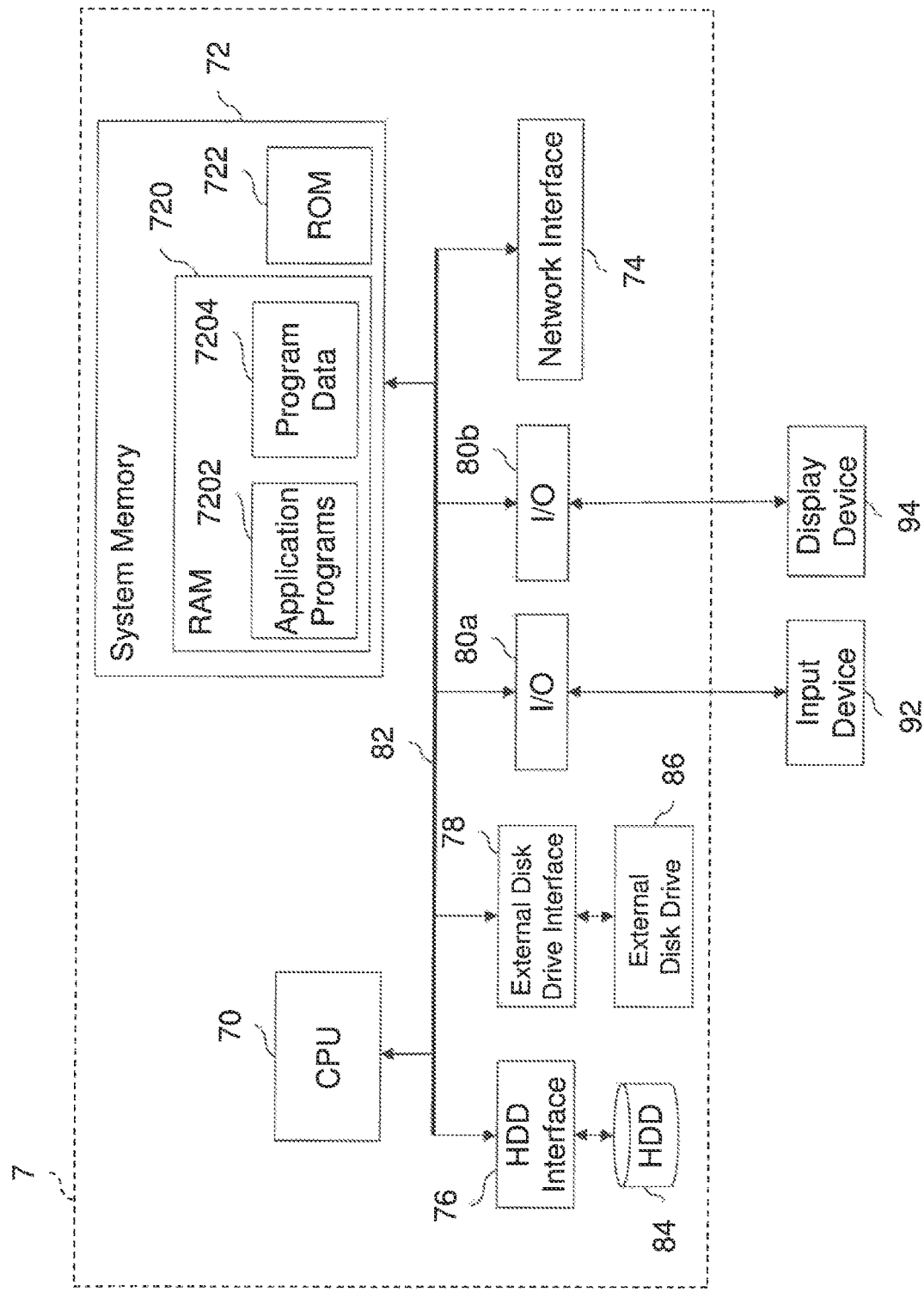
FIG. 6 shows an exemplary hardware configuration of a computer that may be used to implement at least a part of the system described herein.

FIG. 6 shows an exemplary hardware configuration of a computer that may be used to implement the terminal device 20, the server device 40, and/or the client device 50. The computer 7 shown in FIG. 6 includes a CPU 70, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The CPU 70 may implement the processors of the exemplary devices and/or system described above. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the method for collecting and/or retrieving information relating to objects, as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 6, the computer 7 may further be connected to a printer and/or an imaging device such as a camera, via corresponding I/O interfaces and the system bus 82.

In addition or as an alternative to an implementation using a computer 7 as shown in FIG. 6, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The invention claimed is:

1. A system for collecting and/or retrieving information relating to objects, the system comprising:
   an information storage device to at least receive and store an access code associated with and assigned to a user;
   a terminal device connected to the information storage device;
   radio-frequency identification (RFID) tags that are placed in different physical locations, wherein each one of the RFID tags:
      contains information relating to a corresponding object, the information including at least identification information of the corresponding object; and
      is provided at a physical location which facilitates access to the information relating to the corresponding object by a user interested in the corresponding object;
   a mobile device configured to:
      select one or more objects of interest by establishing communication with one or more of the RFID tags corresponding to the one or more objects of interest;
      extract information relating to the one or more objects of interest from the one or more of the RFID tags corresponding to the one or more objects of interest; and
      send the extracted information to the information storage device via a wireless network,
   wherein the information storage device is configured to store the extracted information relating to the one or more objects of interest in association with the access code associated with and assigned to the user, the access code to enable access to the extracted information relating to the one or more objects of interest; and
   wherein the terminal device is configured to, responsive to a request from the user, initiate printing, on a physical medium, the extracted information relating to the one or more objects of interest stored in the information storage device in association with the access code, wherein the request comprises the access code.

2. The system according to claim 1, wherein the RFID tags are near field communication, NFC, tags.

3. The system according to claim 1, wherein the terminal device is further configured to:
   receive user input to modify the information relating to the one or more objects of interest stored in the information storage device in association with the access code; and
   update, in the information storage device according to the received user input, the information relating to the one or more objects of interest stored in the information storage device in association with the access code.

4. The system according to claim 1, further comprising:
   a server device connected to the information storage device, the server device being configured to:
      retrieve, from the information storage device, in response to a data request including the access code, the information relating to the one or more objects of interest stored in association with the access code; and
      output the information retrieved from the information storage device.

5. The system according to claim 4, further comprising:
   an object information database configured to store object information for each object;
   wherein the server device is further connected to the object information database; and
   wherein the server device is further configured to:
      retrieve, from the object information database, using the identification information of the one or more objects of interest, included in the information retrieved from the information storage device, the object information stored for the one or more objects of interest; and
      output the retrieved object information stored for the one or more objects of interest.

6. The system according to claim 5, wherein the terminal device is further configured to:
   retrieve, from the object information database, using the identification information of the one or more objects of interest, included in the extracted information relating to the one or more objects of interest, the object information stored for the one or more objects of interest; and
   provide to the user the retrieved object information stored for the one or more objects of interest.

7. The system according to claim 4, wherein the terminal device is configured to provide the access code to the user by printing the access code on the physical medium in a computer-readable format and/or in a human-readable format; and
   wherein the system further comprises a client device configured to:
      read the access code printed on the physical medium; and
      send the data request including the access code to the server device.

8. The system according to claim 1, further comprising another mobile device configured to:
   select one or more objects of interest by establishing communication with one or more of the RFID tags corresponding to the one or more further objects of interest;
   extract information relating to the one or more further objects of interest from the one or more of the RFID tags corresponding to the one or more further objects of interest; and send the extracted information to the information storage device via the wireless network, wherein the information storage device is further configured to store the extracted information sent from the other mobile device in association with the access code.

9. A method for collecting and/or retrieving information relating to objects, the method comprising:

providing radio-frequency identification, RFID, tags in different physical locations, wherein each one of the RFID tags:

contains information relating to a corresponding object, the information including at least identification information of the corresponding object; and is provided at a physical location which facilitates access to the information relating to the corresponding object by a user interested in the corresponding object;

selecting, by a mobile device, one or more objects of interest by establishing communication with one or more of the RFID tags corresponding to the one or more objects of interest;

extracting, by the mobile device, information relating to the one or more objects of interest from the one or more of the RFID tags corresponding to the one or more objects of interest;

sending, by the mobile device, the extracted information to an information storage device via a wireless network;

storing, in the information storage device, the extracted information relating to the one or more objects of interest in association with an access code associated with and assigned to the user, the access code to enable access to the extracted information relating to the one or more objects of interest; and initiating printing, on a physical medium by a terminal device connected to the information storage device, in response to a request from the user, the extracted information relating to the one or more objects of interest stored in the information storage device in association with the access code, wherein the request comprises the access code.

10. The method according to claim 9, wherein the RFID tags are near field communication, NFC, tags.

11. The method according to claim 9, further comprising:

receiving, by the terminal device, user input to modify the information relating to the one or more objects of interest stored in the information storage device in association with the access code; and updating, by the terminal device, in the information storage device according to the received user input, the information relating to the one or more objects of interest stored in the information storage device in association with the access code.

12. The method according to claim 9, further comprising:

retrieving, from the information storage device by a server device connected to the information storage device, in response to a data request including the access code, the information relating to the one or more objects of interest stored in association with the access code; and outputting, by the server device, the information retrieved from the information storage device.

13. The method according to claim 12, wherein the server device is further connected to an object information database configured to store object information for each object; and wherein the method further comprises:

retrieving, from the object information database by the server device, using the identification information of the one or more objects of interest, included in the information retrieved from the information storage device, the object information stored for the one or more objects of interest; and outputting, by the server device, the retrieved object information stored for the one or more objects of interest.

14. The method according to claim 13, further comprising:

retrieving, from the object information database by the terminal device, using the identification information of the one or more objects of interest, included in the extracted information relating to the one or more objects of interest, the object information stored for the one or more objects of interest; and provide to the user, by the terminal device, the retrieved object information stored for the one or more objects of interest.

15. The method according to claim 12, wherein the terminal device provides the access code to the user by printing the access code on the physical medium in a computer-readable format and/or in a human-readable format; and wherein the method further comprises:

reading, by a client device, the access code printed on the physical medium; and sending, by the client device, the data request including the access code to the server device.

* * * * *